United States Patent [19]

Grantland et al.

[11] 4,454,385
[45] Jun. 12, 1984

[54] LATCHING RELAY HOLD RELEASE CIRCUIT FOR A TELEPHONE INSTRUMENT

[75] Inventors: Gary Grantland, Hartselle; Eduard F. B. Boeckmann, Huntsville, both of Ala.

[73] Assignee: GTE Automatic Electric Inc., Northlake, Ill.

[21] Appl. No.: 437,931

[22] Filed: Nov. 1, 1982

[51] Int. Cl.³ .............................................. H04M 1/00
[52] U.S. Cl. ................................ 179/81 R; 179/99 H
[58] Field of Search ................. 179/81 R, 81 C, 99 H

[56] References Cited

U.S. PATENT DOCUMENTS

| | | | |
|---|---|---|---|
| 4,001,520 | 1/1977 | Waldman et al. | 179/99 H X |
| 4,011,413 | 3/1977 | Phillips | 179/99 H X |
| 4,093,829 | 6/1978 | Silberman | 179/99 H X |
| 4,258,232 | 3/1981 | Smith et al. | 179/99 H X |
| 4,365,117 | 12/1982 | Curtis | 179/99 H |
| 4,387,274 | 6/1983 | Stein et al. | 179/81 R X |
| 4,394,543 | 7/1983 | Keiper, Jr. et al. | 179/99 H X |
| 4,394,544 | 7/1983 | De Leon | 179/99 H |

*Primary Examiner*—A. D. Pellinen
*Assistant Examiner*—Keith E. George
*Attorney, Agent, or Firm*—Anthony Miologos; Peter Xiarhos

[57] ABSTRACT

In a hold circuit including a relay normally latched and connecting the hold circuit to a subscriber telephone line, a first hold release circuit outputs a trigger signal to a silicon controlled rectifier turning on the rectifier responsive to a sensed drop in line potential, thereby providing an electrical path for the discharge of a capacitor. The capacitor discharges through the coil of the relay unlatching the relay and releasing the hold circuit from the line. The hold circuit is also arranged to be released by a second hold release circuit which outputs a trigger signal to the silicon controlled rectifier responsive to a pre-arranged timing interval.

10 Claims, 1 Drawing Figure

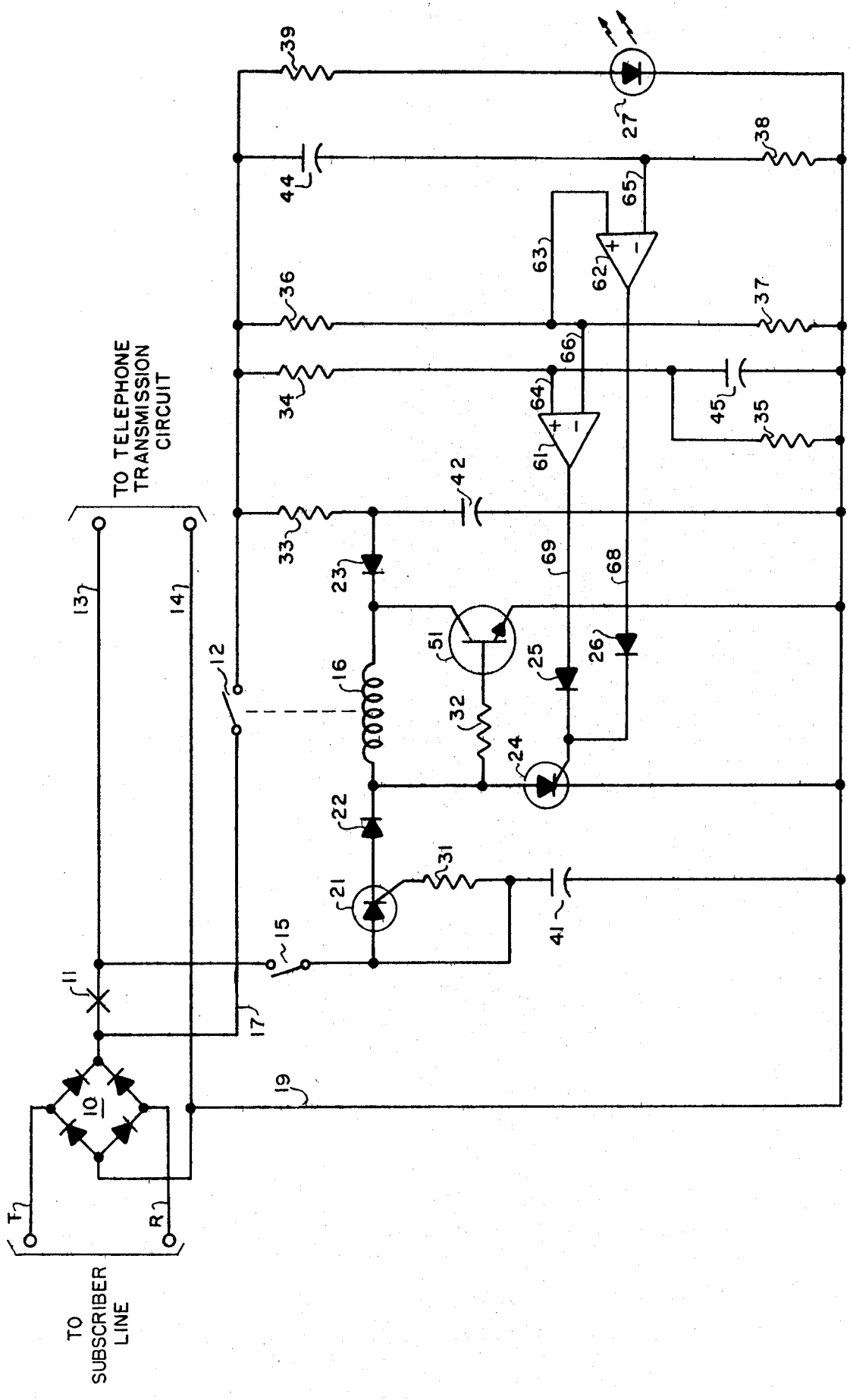

LATCHING RELAY HOLD RELEASE CIRCUIT FOR A TELEPHONE INSTRUMENT

FIELD OF THE INVENTION

This invention relates in general to telephone hold circuits and more particularly to a hold release circuit employing a latching relay.

BACKGROUND OF THE INVENTION

In the course of receiving telephone calls, subscribers who have more than one local extension, frequently find it necessary to shunt (i.e. put to one side or hold in abeyance), a call received on the incoming line until a desired party is called to the telephone or is transferred from one to another local extension. The shunting of such a call is more commonly known as "holding" of a call. For this purpose telephone instruments are provided with a hold circuit activated by a "hold" key or a "hold" button. By manipulating this key or button a subscriber is able to transfer an incoming call to the holding circuit instead of to a local telephone instrument. This holding circuit is essentially a shunting circuit which simulates the electrical characteristics of the subscriber's local telephone instrument. This allows the handset of the telephone initiating the hold to be replaced "on-hook." The hold will be released when any of the extension telephones on the initiating telephone are taken "off-hook."

Although a hold and hold release circuit can be made with only solid-state devices, the complete solid-state circuit requires the use of high current SCR devices, high voltage transistors, and expensive varistors or other devices to protect the circuit from voltage surges. As a consequence, the solid-state circuits are costly and sometimes suffer from poor sensitivity, marginal operation on long loop conditions and an inability to detect high impedance extension phones going "off-hook." Finally, many hold and hold release circuits require a separate power source (not telephone line power) usually from the 110 VAC power line creating a possible hazardous condition.

SUMMARY OF THE INVENTION

The circuit of the present invention is totally telephone line powered and includes SCR control of storage capacitors for operation of a latching reed relay. The relay contacts are rated to withstand voltage surges and in the normally open state, protects the other components of the circuit. The hold release circuit will effectively sense various types of high or low DC resistance telephone extensions when going "off-hook," sensing a change in the telephone loop voltage level due to additional current drawn by the extension telephone.

When the hold is activated by momentary contact closure (user function button) an automatic timing function starts. If an extension telephone is picked up before the circuit times out, the hold will be released. If no extension or the master phone, goes "off-hook" within a specified time, (usually three to six minutes) the hold condition will automatically release.

The latching of the relay is controlled through a single coil by detecting current in opposite directions via first and second storage capacitors and a transistor for the "close" operation and a silicon controlled rectifier or SCR for the "open" operation. The transistor is controlled by an additional SCR which does not turn on until sufficient energy is stored in the first capacitor to trigger the SCR. The SCR used for opening the relay is turned on by either a sensing circuit or a time-out circuit through two diodes which isolate the two circuits from each other.

BRIEF DESCRIPTION OF THE DRAWING

The single sheet of drawings included herewith comprises a schematic diagram of the hold and hold release circuit embodying the principles of operation of the present invention.

DESCRIPTION OF THE PREFERRED EMBODIMENT

The included drawing schematically shows the hold and hold release circuit and elements well known and common to a telephone instrument. Line current is supplied to the hold and hold release circuit from the subscriber's line via the tip (T) and ring (R) leads and diode bridge network 10. The diode bridge 10 ensures that line current and voltage at the proper polarity irrespective of the polarity of the subscriber line is applied to the telephone transmission circuit (not shown) via leads 13 and 14 which are positive and negative, respectively, and to the hold circuit via leads 17 and 19 also positive and negative, respectively. A hookswitch contact 11 is included on lead 13 and is controlled by a typical hookswitch mechanism, which is manually operable into an operated or "off-hook" condition, i.e. when the handset is lifted off the telephone instrument, or non-operated, "on-hook" condition, i.e. when the handset is placed on the telephone instrument.

The hold circuit includes a relay latching circuit comprised of SCR 21 having its anode connected to pushbutton 15 and positive lead 13. The anode of SCR 21 is further connected through capacitor 41 to negative lead 19 of the hold circuit. The cathode of SCR 21 is connected to a latching reed relay coil 16 having a pair of diodes 22 and 23 connected on either end of the coil. A transistor 51 has its collector lead connected to the cathode of diode 23 and one end of coil 16 and its emitter connected to negative lead 19. The base lead of transistor 51 is connected to the cathode of diode 22 and the other end of coil 16 through a biasing resistor 32. Relay coil 16 controls a relay contact 12 located on positive lead 17 of the hold circuit. Contact 12 is arranged to open or close connecting or disconnecting, respectively the hold circuit from the line.

The hold release circuit includes a sensing device 61 comprised of a comparator or other like device having a positive input 64 connected to a voltage divider network comprised of resistors 34 and 35 and a voltage reference capacitor 45. The negative lead 66 of sensing device 61 is connected to a second voltage divider network comprised of resistors 36 and 37. The output 69 of sensing device 61 provides a trigger signal to the gate lead of SCR 24 through an isolation diode 25.

A second sensing device 62 comprised of a comparator or other like device has its output 68 also connected to SCR 24 through a second isolation diode 26. The positive lead 63 of sensing device 62 is connected to the voltage divider comprised of resistor 36 and 37. The negative lead 65 of sensing device 62 is connected to an RC network comprised of resistor 38 and capacitor 44. The hold circuit also includes a resistor 38 and LED 27 which provide a visual indication that the hold circuit is activated as well as shunting the majority of line current through the hold circuit.

A description of the operation of the hold and hold release circuit will hereinafter be described in detail. It should be noted that the included drawings show all contacts and switches in their unoperated conditions.

With a telephone instrument operated, hook-switch contact 11 makes connecting telephone line current from the tip (T) and ring (R) leads to the telephone transmission circuit via lead 13 and 14 and to the hold circuit via lead 17 and 19. Initially silicon controlled rectifier (SCR) 21 is in an off state as is relay 16. Contact 12 is open effectively disconnecting the hold circuit from the subscriber's line.

When the telephone subscriber wishes to place the call on hold, pushbutton 15 is momentarily depressed for a period until capacitor 41 charges sufficiently to provide the necessary gate trigger current for SCR 21. The voltage level to which capacitor 41 is charged to is controlled by telephone loop resistance, and resistor 31. Resistor 31 can be adjusted so that SCR 21 does not trigger until capacitor 41 has reached its practical maximum voltage. When capacitor 41 has charged sufficiently to provide trigger current for SCR 21, capacitor 41 discharges through SCR 21, diode 22, relay coil 16 and transistor 51 to the negative lead 19 of the hold circuit. Transistor 51 is turned on by a bias voltage through resistor 32 when SCR 21 turns on. The discharge current from capacitor 41 latches relay contact 12 closed connecting positive lead 17 to the hold circuit. After capacitor 41 completely discharges, SCR 21 and transistor 51 turn off, disconnecting the relay latching circuit. At this time, capacitors 42, 45 and 44 charge up through resistors 33, 34 and 38, respectively. LED 27 and current limiting resistor 39 carry the bulk of the line current and provides the load for seizing the subscriber's line. LED 27 turns on visually indicating that the hold function is operational. The master phone handset may now be placed "on-hook" disconnecting the transmission circuit from the subscriber's line.

The hold circuit is released in any of two ways. In the first method capacitor 44 and resistor 38 determine a time out period depending on the RC time constant of the circuit. The instant relay contact 12 closed, capacitor 44 charges to a negative potential through resistor 38 to a predetermined level. When capacitor 44 has charged for approximately one time constant sensing device 62 lead 65 becomes more negative than lead 63. Output lead 68 goes high coupling the signal through diode 26 to SCR 24. The output signal of device 62 is sufficient to trigger SCR 24 into forward conduction allowing the charge built up in capacitor 42 to dump through diode 23, relay coil 16 and SCR 24 to the negative side of the line 19. This unlatches the relay contact 12 disconnecting the hold circuit from the telephone line. The time-out period for the hold release circuit is dependent upon the values of capacitor 44 and resistor 38 and is normally between three to six minutes.

The hold circuit may be released before the time-out peiod by sensing if an extension telephone or the master phone is taken "off-hook." In this second method a second sensing device 61 has its output lead 69 connected to SCR 24 via an isolation diode 25. Sensing device 61 has a positive lead 64 connected to a voltage divider network comprised of resistors 34 and 35 which senses the loop voltage of the subscriber's line. A negative lead 66 is connected to a second voltage divider comprised of resistors 36 and 37 which sense drops in loop voltage within the subscriber's line such as when an extension phone goes "off-hook." Capacitor 43 provides a stable voltage reference for sensing device 61 and charges to the value of the loop voltage.

The hold circuit is activated in the manner discussed previously and the handset of the master telephone is placed "on-hook." If either an extension telephone or the transmission circuit of the master telephone is reconnected by taking the handset "off-hook," resistors 36 and 37 sense the drop in line voltage due to the decreased line current through the hold release circuit. The negative lead 66 of sensing device 61 becomes more negative in respect to the voltage sensed by lead 64 and referenced by capacitor 43. Sensing device 61 thereby outputs a high through lead 69, diode 25 to SCR 24 triggering SCR 24 into forward conduction. When SCR 24 turns on capacitor 42 dumps its charge through diode 23, relay coil 16 and SCR 24 to negative lead 19. This effectively unlatches contact 12 disconnecting the hold circuit from the subscriber's line.

The circuit is equally sensitive on short and long telephone loops with a wide range of extension telephone impedances. The relay contact effectively protects the circuit from any voltage surges which may be transmitted through the subscriber's line such as lightning surges and the like. The circuit does not respond to high voltage ring signals and does not drain ring current in the "off-mode."

Although the best mode contemplated for carrying out the present invention has been herein shown and described, it will be apparent that modifications and variations may be made without departing from what is regarded as subject matter of the invention.

What is claimed is:

1. A hold release circuit for use with at least one telephone instrument and a hold circuit, said hold circuit connected to a subscriber line and a source of line voltage and said telephone instrument disconnected from said subscriber line, said hold release circuit comprising;

a latching relay including a coil and at least one contact controlled by said coil, said contact closed connecting said hold circuit to said subscriber line;

voltage storage means connected to said coil and arranged to charge to said subscriber line voltage;

first and second line voltage sensors each connected across said subscriber line and each producing a respective output representative of said line voltage, said first line voltage sensor including means for retaining the highest value of line voltage sensed;

comparator means having first and second inputs connected to said first and second line voltage sensor outputs, respectively, said comparator means arranged to produce an output signal responsive to said first and second line voltage sensors; and switching means connected to said coil and said output of said comparator means, said switching means normally turned off; whereby said second line voltage sensor produces an output representative of a drop in line voltage when said telephone instrument is connected to said line causing said comparator to produce said output signal turning on said switching means and discharging said voltage storage means through said coil opening said contact and releasing said hold circuit.

2. The hold release circuit as claimed in claim 1, wherein: said voltage storage means comprises a capacitor and a resistor connected across said subscriber line and said capacitor charges through said resistor to said subscriber line voltage.

3. The hold release circuit as claimed in claim 1, wherein: said first line sensor is comprised of a voltage divider having at least two resistors and a capacitor, said capacitor charging to the highest voltage sensed by said resistors.

4. The hold release circuit as claimed in claim 1, wherein: said second line sensor is comprised of a voltage divider network having at least two resistors connected across said line and arranged to produce a voltage representative of said line voltage.

5. The hold release circuit as claimed in claim 1, wherein: said comparator means comprises a comparator circuit having a positive and negative input and said positive input is connected to said first line sensor and said negative input is connected to said second line sensor whereby responsive to said negative input becoming more negative than said positive input said comparator produces said output signal.

6. The hold release circuit as claimed in claim 1, wherein: said switching means comprises a silicon controlled rectifier having its anode connected to said coil and its cathode to said subscriber line said silicon controlled rectifier including trigger input connected to said comparator output said silicon controlled rectifier arranged to turn on establishing an electrical path from said voltage storage means and through said coil and said silicon controlled rectifier when said comparator means produces said output signal.

7. A hold release circuit for use with at least one telephone instrument and a hold circuit, said hold circuit connected to a subscriber line and a source of line voltage, and said telephone instrument disconnected from said subscriber line, said hold release circuit comprising:
  a latching relay including a coil and at least one contact controlled by said coil said contact closed connecting said hold circuit to said subscriber line;
  voltage storage means connected to said coil arranged to charge to said subscriber line voltage;
  hold release time-out means connected across said subscriber line arranged to produce an output signal when said time-out period is obtained;
  first and second line voltage sensors each connected across said subscriber line and each producing an output representative of said line voltage, said first line voltage sensor including means for retaining the highest value of line voltage sensed;
  first comparator means having first and second inputs connected to said first and second line voltage sensors, respectively, said comparator means arranged to produce an output responsive to the difference in line voltage between said first and second line voltage sensors;
  second comparator means having first and second inputs connected to said second line voltage sensor and time-out means, respectively, said second comparator means arranged to produce an output signal responsive to said time-out circuit; and
  switching means connected to said coil and the output of said first and second comparator means, said switching means normally disconnected; whereby said second line voltage sensor produces an output representative of a drop in line voltage when said telephone instrument is connected to said subscriber line causing said first comparator to produce said output signal turning on said switching means and alternatively in the event said telephone instrument is not connected to said subscriber line said time-out circuit produces an output signal to said second comparator causing said comparator to produce said output signal turning on said switching means and discharging said voltage storage means through said coil opening said contact and releasing said hold circuit.

8. The hold release circuit as claimed in claim 7, wherein: said time-out means comprises a resistor and capacitor connected in series across said line and said capacitor charges to said line voltage at a predetermined rate.

9. The hold release circuit as claimed in claim 7, wherein: said second comparator means comprises a comparator circuit having a positive input connected to said second line voltage sensor and a negative input connected to said time-out means said comparator arranged to produce an output signal to said switching means when said negative input becomes more negative than said positive input.

10. The hold release circuit as claimed in claim 7, wherein: said first comparator means and said second comparator means output each include a diode and each of said diodes cathode ends are connected to said switching means isolating the outputs of said first and second comparator means from each other.

* * * * *